(No Model.)   3 Sheets—Sheet 1.
G. H. LASAR.
TYPE WRITING MACHINE.
No. 415,537.   Patented Nov. 19, 1889.
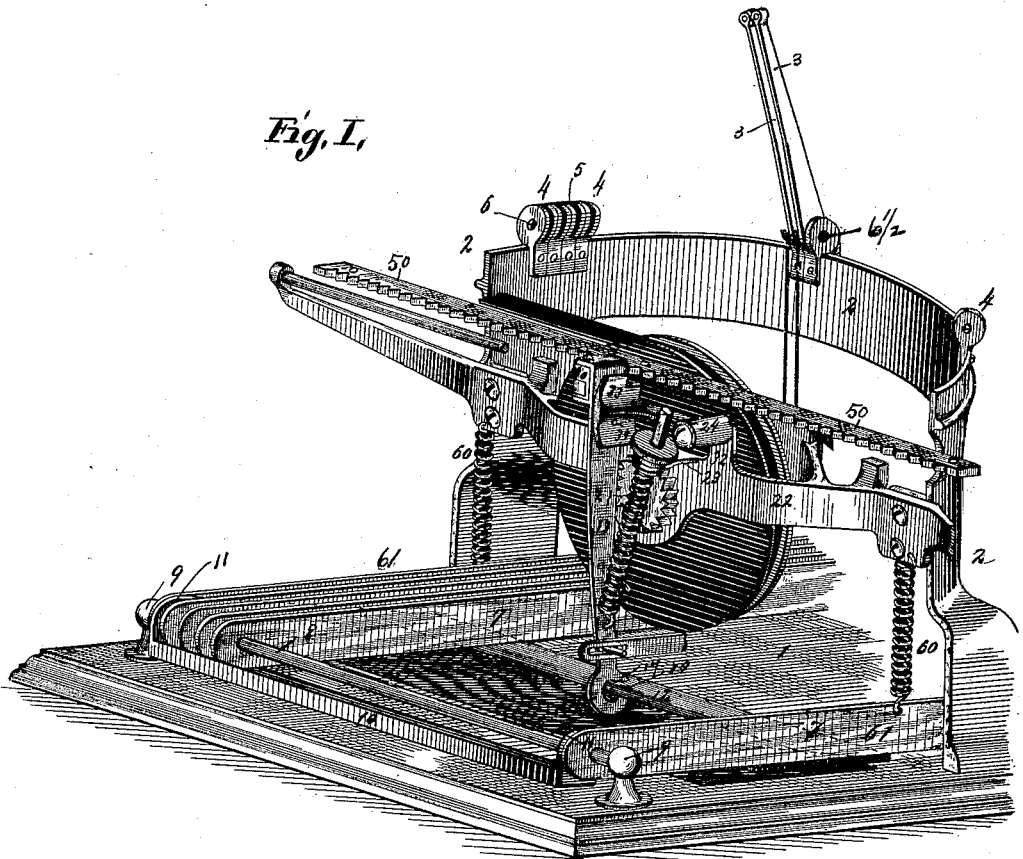
Fig. I.
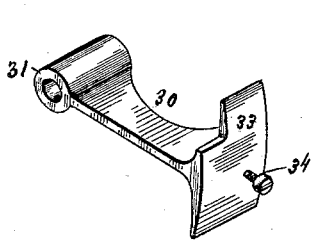
Fig. II.
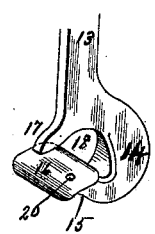
Fig. III.
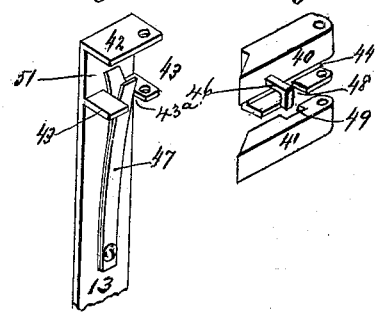
Fig. IV.   Fig. V.
Attest:
G. N. Hinchman Jr.
Emma Arthur.
Inventor:
Godfrey H. Lasar
By Knight Bro
Attys.

(No Model.) 3 Sheets—Sheet 2.
G. H. LASAR.
TYPE WRITING MACHINE.
No. 415,537. Patented Nov. 19, 1889.
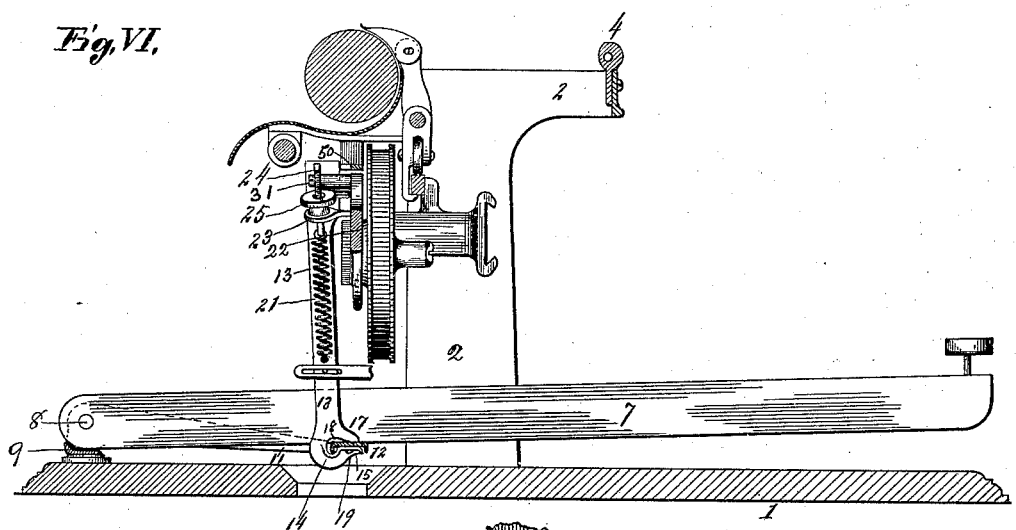
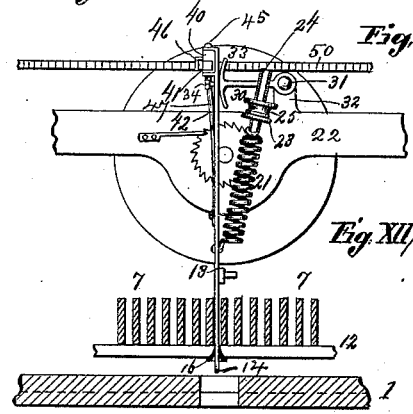
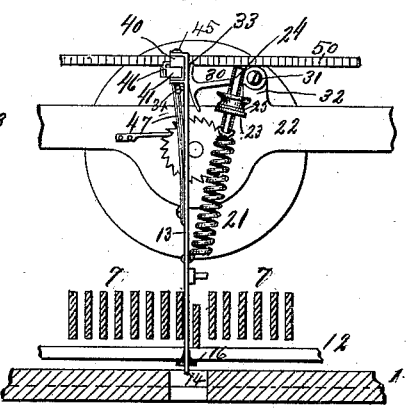
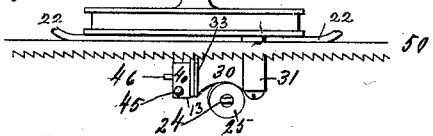
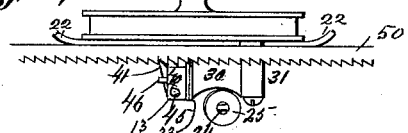
Attest:
G. N. Hinchman Jr.
Emma Arthur
Inventor:
Godfrey H. Lasar
By Knight Bros
Atty's.
N. PETERS, Photo-Lithographer, Washington, D. C.

(No Model.) 3 Sheets—Sheet 3.
G. H. LASAR.
TYPE WRITING MACHINE.
No. 415,537. Patented Nov. 19, 1889.
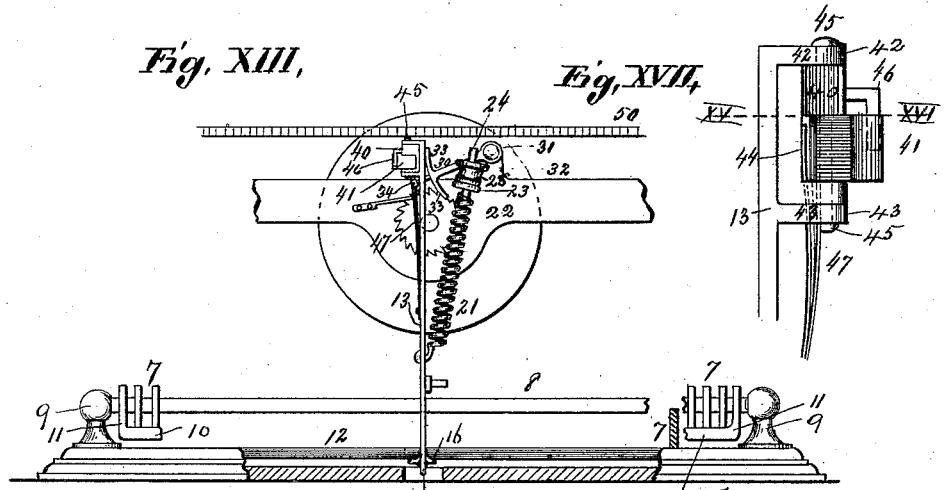
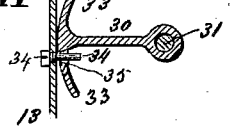
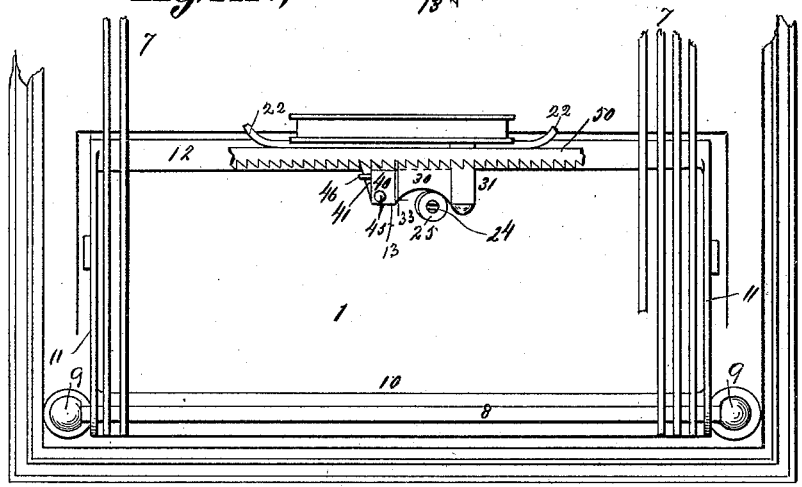
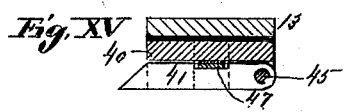
Attest:
G N Hinchman Jr
Emma Arthur
Inventor;
Godfrey H. Lasar
By Knight Bro
Attys.
N. PETERS. Photo-Lithographer, Washington, D. C.

UNITED STATES PATENT OFFICE.

GODFREY H. LASAR, OF ST. LOUIS, MISSOURI.

TYPE-WRITING MACHINE.

SPECIFICATION forming part of Letters Patent No. 415,537, dated November 19, 1889.

Application filed February 7, 1888. Serial No. 263,221. (No model.)

*To all whom it may concern:*

Be it known that I, GODFREY H. LASAR, of the city of St. Louis, in the State of Missouri, have invented a certain new and useful Improvement in Type-Writing Machines, of which the following is a full, clear, and exact description, reference being had to the accompanying drawings, forming part of this specification, and in which—

Figure I is a perspective view illustrative of my improvement. Fig. II is an enlarged perspective view of the segment that forms a bearing for the escapement-plate. Fig. III is an enlarged perspective view of the lower end of the escapement-plate. Fig. IV is an enlarged perspective view of the upper end of the escapement-plate, showing the dogs removed. Fig. V is an enlarged perspective view of the dogs disconnected. Fig. VI is a vertical section through the machine, showing the parts illustrated in Fig. I, and in addition thereto the carriage. Fig. VII is a detail elevation showing the key-levers in transverse section. Fig. VIII is a similar view showing the parts in a different position. Fig. IX is a top view of the parts shown in Fig. VII, and showing the parts in the same position as in Fig. VII. Fig. X is a similar view showing the parts in the position shown in Fig. VIII. Fig. XI is an enlarged detail top view showing the adjusting-screw of the escapement-spring. Fig. XII is a section taken on line XII XII, Fig. XI. Fig. XII½ is a top view of the arm through which the adjusting-screw passes. Fig. XIII is a similar view to Figs. VII and VIII, with the escapement forced downward still farther than shown in Fig. VIII. Fig. XIV is a detail top view. Fig. XV and XVI are sections taken on line XV XVI, Fig. XVII, showing the parts in different positions. Fig. XVII is an enlarged view of the upper end of the escapement. Fig. XVIII is a longitudinal section through part of the escapement-plate and through the segment.

My invention relates to certain improvements in type-writers; and my invention consists in features of novelty hereinafter fully described, and pointed out in the claims.

Referring to the drawings, 1 represents the base of the machine, and 2 the frame, which forms the support of the type-carrying levers 3, two of which are shown in Fig. I. The type-bars 3 are secured in the frame 2 by means of clips 4, riveted or otherwise connected to the frame. Each clip has a slot 5, in which its type-bar fits, and has a hole or perforation 6, through which a pivot-pin 6½, that connects the bar to the clip, passes. In this manner each bar is separately attached to the frame and the clip by which it is attached is independent of the clips of the other type-bars, and may upon being worn or broken be replaced by another at a trifling expense.

7 represents the key-levers, (part only of them being shown,) which are pivoted at the rear of the machine on a rod or shaft 8, supported in standards 9, extending upward from the base 1. A frame consisting of a rear bar 10, sides 11, and a front bar 12 is also supported on the rod or shaft 8, the front plate 12 extending beneath the key-levers, as shown in Figs. I, IV, and XIV. To this plate or bar 12 is connected the lower end of an escapement-plate 13. The lower end of the plate is made in the form shown most clearly in Fig. III. It has a hook-shaped extension 14, the point 15 of which is flattened into a head 16. Above the head 16 there extends a projection 17. The plate is connected to the bar 12 by the latter fitting into the opening 18 of the plate, the head 16 fitting beneath the bar and the projection 17 above the bar. This is shown clearly in Fig. VI. After the parts are placed together the projection 17 may be pressed down upon the bar 12, so as to form a close connection between the escapement-plate and the bar 12. I prefer to employ a pin or rivet 19 to connect the escapement-plate with the bar 12, the pin preferably passing through a hole in the bar and a like hole 20 in the head 16 of the escapement-plate. The object of this is to prevent lateral movement of the escapement-plate on the bar.

21 represents a spring connected by its lower end to the escapement-plate 13 and at its upper end to a frame 22 of the machine. The connection between the spring and the frame 22 is preferably made by means of an arm 23, projecting from the frame, through which a threaded pin 24 on the end of the spring 21 passes. On the pin 24 above the arm 23 is a nut 25. By adjusting this nut up or down the tension of the spring 21 may be regulated. The action of the spring is to replace the escapement-plate or draw it back into its normal position when it has been depressed by operating one of the key-levers 7. To prevent the pin 24 from turning with the nut 25, I make it non-circular in transverse section, as shown most clearly in Fig. XI, and make the hole in the arm 23 of a corresponding shape, (see Fig. XII½,) and it will thus be seen that when the nut is turned to move the pin in a vertical direction the latter will not be allowed to turn with the nut. The spring also assists to elevate or raise the levers 7 each time they are depressed, and this means of raising the key-levers, as well as moving the escapement back to its normal position, is one that is not liable to get out of order, and is durable, for the reason that it has always a straight pull, and not a push and pull movement. As the escapement-plate is constantly moving in a vertical plane while the machine is being operated, and as this movement must be free and easy, it is desirable to have a bearing for its upper end which will give very little resistance to the movement of the escapement-plate and at the same time not wear any perceptible degree in the constant use of the machine. I have produced such a device, and it consists of a segment composed of an arm 30, pivoted by its inner end at 31 to the frame 22, or to a projection or stud 32 on the frame. The outer end of the arm is provided with a head 33, formed in the arc of a circle, and against this head the escapement-plate bears and is held by the spring 21. As the escapement-plate is moved from the position shown in Fig. VII to the position shown in Fig. VIII, and from the latter position to the position shown in Fig. XIII, and vice versa, the segment rocks on its bearing 31 and offers very little resistance to the movement of the escapement, and the wearing of the parts upon each other is reduced to a minimum. I prefer to connect the escapement-plate to the segment by means of a screw or pin 34, which passes through a tapering hole 35 in the head of the segment, as shown in Fig. XVIII. The object of this pin is to prevent the outer end of the segment from falling down and away from the plate; but it does not prevent the movement of the parts as stated.

40 41 represent the dogs of the escapement. The dog 41 is disengaged from the rack 50 of the machine each time a key-lever is operated and is thrown forward the distance of one notch, as usual, so that when the escapement rises it allows the carriage, which carries the rack, to move forward the distance of one notch. The dogs are constructed and connected to the plate in this manner—that is, by a flange 42, extending laterally from the upper end of the escapement-plate, and a lower lateral flange 43, having a notch 43ª. The dog 40 fits in between these two flanges, as shown in Fig. XVII, and it is provided with a recess 44, into which the dog 41 fits. The dogs are connected together and to the escapement-plate by means of a pin 45, passing through the flanges 42 43 and through the dogs. The dog 40 is provided with an L-shaped projection 46, which forms a stop for the outward movement of the free end of the dog 41, as shown in Fig. XVI. It is necessary that the dog 40 be held against the escapement-plate while the machine is in use, and yet it is necessary for it to be capable of being moved away from the escapement-plate, turning on the pivot 45. This latter is necessary when it is desired to run the carriage back at the time this dog is down in engagement with the rack of the carriage, as shown in Fig. VIII. To hold the dog against the escapement-plate, and also to throw the dog 41 away from the dog 40 when the escapement is pulled down, I use a double spring 47. The inner member of this spring bears against the dog 40, it fitting in a notch 48. (Shown in Fig. V.) Its pressure is inward, so that it tends to hold the dog 40 against the escapement-plate. The other or outer member of the spring fits in between the two dogs and in a notch 49 of the dog 41. The tendency of this member is outward to move the free end of the dog 41 away from the dog 40 and out against the projection 46, as shown in Fig. XVI. The inner member of the spring also performs the additional function of holding the dog 40 in place while the dog 41 is being inserted, as the connecting-pin 45 has not yet been inserted. This member of the spring simply presses the dog 40 against the wall 51 (see Fig. IV) of the escapement-plate, and thus holds it until the pivot-pin 45 is inserted.

60 represents springs, which may be employed to keep the spacer-levers 61 in their elevated position.

The escapement herein shown and described is an improvement on the construction shown, described, and claimed in my application, Serial No. 215,904, filed October 11, 1886. In my present invention I am enabled to dispense with the overhanging fixed dog and the arm carrying the movable dog, and by extending the escapement-plate vertically and providing it with flanges I furnish a more simple support for the dogs.

I claim as my invention—

1. In a type-writer, the combination of the escapement, key-levers, and a frame extending beneath the key-levers, the escapement-plate having a hook on its lower end provided with a head, and a projection extending from the plate over the head on the hook, substantially as and for the purpose set forth.

2. In a type-writer, the combination of the escapement-plate, key-levers, and a frame extending beneath the key-levers, the escapement-plate having a hook with a head to fit under the said frame, and a pin connecting the head on the hook to the frame, substantially as and for the purpose set forth.

3. In a type-writer, in combination with a movable escapement-plate, a spring secured to the said plate and to the frame of the machine, and a bearing for said plate, consisting of a pivoted rocking segment, the spring causing the plate to bear on the segment and the segment guiding the plate in its vertical movement, substantially as and for the purpose set forth.

4. In a type-writer, in combination with a movable escapement-plate, a spring secured to the said plate and to the frame of the machine, and a bearing for said plate, consisting of a pivoted rocking segment, and a pin connecting the segment to the escapement-plate, the spring causing the plate to bear on the segment and the segment guiding the plate in its vertical movement, substantially as and for the purpose set forth.

5. In a type-writer, the combination of the vertically-moving escapement-plate 13, having dogs projecting in a horizontal direction, a spacer-frame hinged to the base of the machine, having a front bar 12, with which the escapement-plate has direct connection, the key-levers extending over the front bar, and a coil-spring connected at its lower end to the escapement-plate in close proximity to the key-levers and secured at its upper end to a fixed part of the machine.

6. In a type-writer, the combination of the vertically-moving escapement-plate 13, having upper flange 42 and lower flange 43, having notch 43$^a$, the double spring 47, having its free ends occupying the notch, the dog 40, and projection 46, the dog 41, having notch 49, and a pivot-pin by which the dogs are hinged to the flanges, the ends of the double spring being adapted to occupy the notch of the dog 41 to press one dog against the wall of the plate and the other dog outward.

7. The combination, with a key-lever, escapement-frame, and a carriage having a fixed rack, of a vertically-moving escapement-plate 13, having upper flange 42 and lower flange 43, the fixed dog 40, the movable dog 41, pivoted with the fixed dog to the flanges, the spring for pressing the movable dog outward, and the projecting stop limiting the outward movement of the movable dog, substantially as described.

GODFREY H. LASAR.

In presence of—
GEO. H. KNIGHT,
JOS. WAHLE.